(12) United States Patent
Everly et al.

(10) Patent No.: US 10,815,858 B2
(45) Date of Patent: Oct. 27, 2020

(54) EXHAUST SYSTEM WITH ACTUATED FLOW BYPASS AND THERMAL STORAGE DEVICE

(71) Applicant: WATLOW ELECTRIC MANUFACTURING COMPANY, St. Louis, MO (US)

(72) Inventors: Mark D. Everly, St. Charles, MO (US); Magdi Khair, San Antonio, TX (US); Louis P. Steinhauser, St. Louis, MO (US); George F. Jambor, Dover, MN (US); Jacob Lindley, St. Louis, MO (US)

(73) Assignee: WATLOW ELECTRIC MANUFACTURING COMPANY, St. Louis, MO (US)

(*) Notice: Subject to any disclaimer, the term of this patent is extended or adjusted under 35 U.S.C. 154(b) by 70 days.

(21) Appl. No.: 16/162,441

(22) Filed: Oct. 17, 2018

(65) Prior Publication Data
US 2019/0053330 A1 Feb. 14, 2019

Related U.S. Application Data

(63) Continuation of application No. 15/448,130, filed on Mar. 2, 2017, now abandoned.
(Continued)

(51) Int. Cl.
*F01N 13/00* (2010.01)
*F01N 9/00* (2006.01)
(Continued)

(52) U.S. Cl.
CPC ............. *F01N 9/005* (2013.01); *F01N 3/023* (2013.01); *F01N 3/027* (2013.01); *F01N 3/2006* (2013.01);
(Continued)

(58) Field of Classification Search
CPC .. F02D 41/1446; F02D 41/024; F02D 41/222; F01N 9/002; F01N 3/023;
(Continued)

(56) References Cited

U.S. PATENT DOCUMENTS 5,144,796 A * 9/1992 Swars .................. F01N 3/2053
60/288
5,233,970 A 8/1993 Harris
(Continued)

FOREIGN PATENT DOCUMENTS

DE 19720205 11/1998
DE 102004052107 5/2006
(Continued)

OTHER PUBLICATIONS

International Search Report for International Application PCT/US2017/020516, dated May 15, 2018.

*Primary Examiner* — Matthew T Largi
(74) *Attorney, Agent, or Firm* — Burris Law, PLLC

(57) ABSTRACT

An exhaust system is provided that includes an exhaust aftertreatment unit, first and second exhaust pathway in communication with and upstream of the exhaust aftertreatment unit, a thermally activated flow control device operable in a first and second mode, and a thermal storage device. In the first mode, the flow control device permits exhaust to flow to the aftertreatment unit through the first pathway and inhibits flow through the second pathway. In the second mode, the flow control device permits exhaust flow to the aftertreatment unit through the second pathway and inhibits flow through the first pathway. The flow control device may switch between the first and second modes based on a change of temperature. The thermal storage device is within the second pathway, stores thermal mass, and provides thermal insulation to enable a catalyst of the aftertreatment unit to maintain a predetermined temperature for a predetermined time.

20 Claims, 6 Drawing Sheets

Related U.S. Application Data

(60) Provisional application No. 62/302,482, filed on Mar. 2, 2016.

(51) Int. Cl.

| | | |
|---|---|---|
| *F01N 11/00* | (2006.01) | |
| *F01N 3/027* | (2006.01) | |
| *G01F 1/68* | (2006.01) | |
| *H05B 1/02* | (2006.01) | |
| *F02D 41/02* | (2006.01) | |
| *F02D 41/14* | (2006.01) | |
| *G05D 23/185* | (2006.01) | |
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G01K 7/16* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *H05B 3/18* | (2006.01) | |
| *H05B 3/00* | (2006.01) | |
| *F01N 3/023* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC .............. *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/26* (2013.01); *Y02T 10/47* (2013.01)

(58) Field of Classification Search
CPC .... F01N 3/2006; F01N 11/002; F01N 3/2013; F01N 3/027; F01N 2900/1602; F01N 2900/1404; F01N 2550/22; F01N 2240/36; F01N 2240/16; F01N 2240/10; H05B 3/0042; H05B 3/18; G01F 1/86; Y02T 10/26
See application file for complete search history.

(56) References Cited

U.S. PATENT DOCUMENTS

| | | | | |
|---|---|---|---|---|
| 5,279,117 | A * | 1/1994 | Kaiser | F01N 3/20 |
| | | | | 60/292 |
| 5,553,451 | A * | 9/1996 | Harada | F01N 3/2013 |
| | | | | 60/277 |
| 5,582,003 | A * | 12/1996 | Patil | B01D 53/9454 |
| | | | | 60/284 |
| 5,716,133 | A | 2/1998 | Hosokawa et al. | |
| 5,738,832 | A | 4/1998 | Dogahara et al. | |
| 6,310,327 | B1 | 10/2001 | Moore et al. | |
| 6,373,033 | B1 | 4/2002 | de Waard et al. | |
| 7,251,929 | B2 | 8/2007 | Hu et al. | |
| 7,403,704 | B2 | 7/2008 | Eccleston et al. | |
| 7,434,387 | B2 | 10/2008 | Yan | |
| 8,209,960 | B2 | 7/2012 | Shamis et al. | |
| 8,361,422 | B2 | 1/2013 | Soukhojak et al. | |
| 8,652,259 | B2 | 2/2014 | Poppe et al. | |
| 9,212,422 | B2 | 12/2015 | Higashi et al. | |
| 9,506,386 | B2 | 11/2016 | Brunel | |
| 10,145,279 | B2 * | 12/2018 | Hussain | F01N 3/0205 |
| 2002/0005178 | A1 * | 1/2002 | Iwatani | F01M 5/021 |
| | | | | 123/41.14 |
| 2002/0139114 | A1 | 10/2002 | Dickau | |
| 2005/0115224 | A1 | 6/2005 | Kojima | |
| 2010/0011764 | A1 * | 1/2010 | Andrews | F01D 17/085 |
| | | | | 60/602 |
| 2010/0319331 | A1 | 12/2010 | Wagner et al. | |
| 2011/0214569 | A1 | 9/2011 | Gonze et al. | |
| 2012/0144812 | A1 | 6/2012 | Hyun | |
| 2012/0152487 | A1 * | 6/2012 | Styles | F01N 5/02 |
| | | | | 165/10 |
| 2012/0198821 | A1 | 8/2012 | Soukhojak et al. | |
| 2013/0081626 | A1 | 4/2013 | Pujol et al. | |
| 2013/0199751 | A1 * | 8/2013 | Levin | F02G 5/02 |
| | | | | 165/10 |
| 2014/0190151 | A1 * | 7/2014 | Culbertson | H05B 1/0236 |
| | | | | 60/303 |
| 2015/0089943 | A1 * | 4/2015 | Hussain | F01N 5/02 |
| | | | | 60/615 |
| 2015/0143811 | A1 | 5/2015 | Pang et al. | |
| 2015/0152766 | A1 | 6/2015 | Brunel | |
| 2015/0247651 | A1 | 9/2015 | Hariu et al. | |

FOREIGN PATENT DOCUMENTS

| | | | |
|---|---|---|---|
| DE | 102004052107 A1 * | 5/2006 | .......... F01N 3/0871 |
| DE | 102012111335 | 5/2013 | |
| EP | 0699828 | 3/1996 | |
| EP | 2146071 | 1/2010 | |
| GB | 2403791 | 1/2005 | |
| JP | H10184346 | 7/1998 | |
| WO | 2015/046506 | 4/2015 | |
| WO | 2016/009259 | 1/2016 | |

* cited by examiner

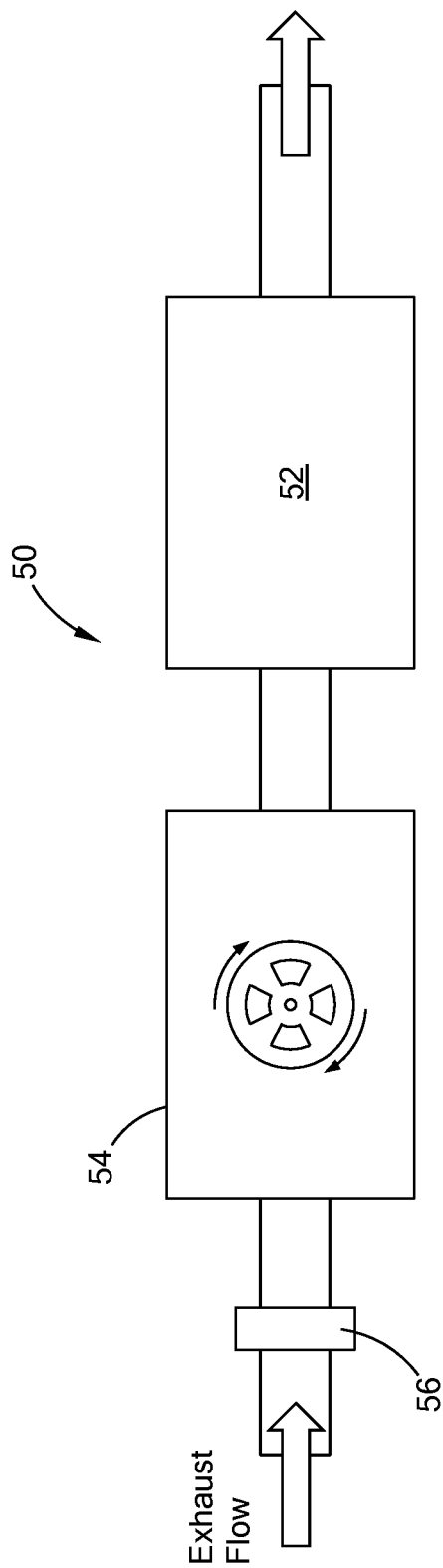
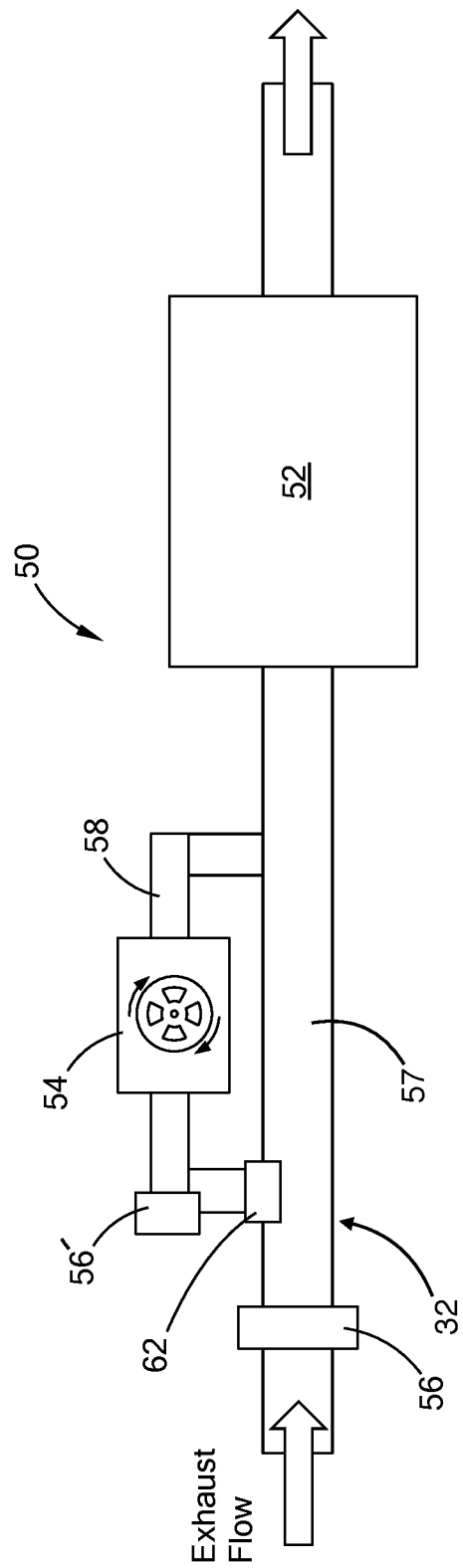

EXHAUST SYSTEM WITH ACTUATED FLOW BYPASS AND THERMAL STORAGE DEVICE

CROSS-REFERENCE TO RELATED APPLICATIONS

This application is a continuation of U.S. application Ser. No. 15/448,130 (published as U.S. Publication Number 2017/0254241), which claims priority to and the benefit of U.S. provisional application Ser. No. 62/302,482, filed on Mar. 2, 2016. The contents of the above applications are incorporated herein by reference in their entirety. This application and the originally filed U.S. Ser. No. 15/448,130 are also related to co-pending applications titled "Bare Heating Elements for Heating Fluid Flows," U.S. application Ser. No. 15/448,186 (U.S. Pub. No. 2017/0273146), "Virtual Sensing System," U.S. application Ser. No. 15/447,942 (U.S. Pub. No. 2017/0256104), "Advanced Two-Wire Heater System for Transient Systems," U.S. application Ser. No. 15/447,964 (U.S. Pub. No. 2017/0359857), "Heater Element Having Targeted Decreasing Temperature Resistance Characteristics," U.S. application Ser. No. 15/447,994 (U.S. Pub. No. 2017/0257909), "System for Axial Zoning of Heating Power," U.S. application Ser. No. 15/448,044 (U.S. Pub. No. 2017/0254248), "Dual-Purpose Heater and Fluid Flow Measurement System," U.S. application Ser. No. 15/448,068 (U.S. Pub. No. 2017/0254242), "Heater-Actuated Flow Bypass," U.S. application Ser. No. 15/448,162 (U.S. Pub. No. 2017/0254250), and "Susceptor for Use in a Fluid Flow System," U.S. application Ser. No. 15/448,108 (U.S. Pub. No. 2017/0254249) which were concurrently filed with application Ser. No. 15/448,130 and commonly assigned with the present application. The contents of the above applications are incorporated herein by reference in their entirety.

FIELD

The present disclosure relates to exhaust systems with an actuated flow bypass and thermal storage device, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of the any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to reduce and/or avoid failure of any of the heating elements. Therefore, the heating elements that are under the less harsh heating conditions are typically operated to generate a heat output that is much below their maximum available heat output.

SUMMARY

In one form of the present disclosure, an exhaust system is provided that includes an exhaust aftertreatment unit, a first exhaust pathway in fluid communication with the exhaust aftertreatment unit and upstream of the exhaust aftertreatment unit, a second exhaust pathway in fluid communication with the exhaust aftertreatment unit and upstream of the exhaust aftertreatment unit, a thermally activated flow control device operable in a first mode and a second mode, and a thermal storage device. When the flow control device is in the first mode, the flow control device permits exhaust to flow to the aftertreatment unit through the first exhaust pathway and inhibits exhaust flow thereto through the second exhaust pathway. When in the second mode, the flow control device permits exhaust flow to the exhaust aftertreatment unit through the second exhaust pathway and inhibits exhaust flow thereto through the first exhaust pathway. The flow control device is configured to switch between the first and second modes based on a change of temperature. The thermal storage device is disposed within the second exhaust pathway, and is configured to store thermal mass and provide thermal insulation to enable a catalyst of the exhaust aftertreatment unit to maintain a minimum predetermined temperature for a minimum predetermined time.

In various forms of the exhaust system, the exhaust system may further include an electric heater disposed upstream of the thermal storage device and/or the electric heater may be disposed within the second exhaust pathway. The flow control device may be configured to switch to the second mode when the electric heater is turned on. In this form, the thermal storage device may release thermal energy when the heater is turned off and when the fluid temperature surrounding the thermal storage device is lower than the temperature of the thermal storage device. The exhaust aftertreatment unit may be selected from the group consisting of a catalytic converter, a diesel particulate filter, a selective catalytic reduction, a diesel oxidation catalyst, a lean nitrogen oxides (NOx) trap, an ammonia slip catalyst, reformers, a decomposition tube, and combinations thereof.

In another form, the flow control device is configured to switch to the second mode when an exhaust fluid temperature is above a predetermined temperature, in which the thermal storage device is configured to absorb heat from the exhaust fluid to cool the exhaust fluid when the exhaust fluid is above the predetermined temperature.

In yet another form, the thermal storage device includes a phase change material. In this form, the thermal storage device changes phase between a temperature of approximately 180° C. and 450° C.

In a further form, the first exhaust pathway is an inner flow channel and the second exhaust pathway is an outer flow channel surrounding the inner flow channel.

In still another form, the second exhaust pathway is a bypass channel disposed outside of a fluid flow path of the first exhaust pathway.

In another form, the exhaust system further includes an actuator coupled to the flow control device and configured to switch the flow control device between the first and second modes. In this form, the actuator may be powered by thermal energy and/or may include a material selected from the group consisting of a shape memory alloy, a bimetallic construction, and combinations thereof.

In another form, the flow control device includes a flapper member disposed upstream of the first and second exhaust pathways, the flapper member is configured to change position in response to heat from a heater.

In yet another form, the flow control device includes at least one flexible member configured to change shape based on temperature. When the flexible member is a first predetermined temperature, the flexible member is in a first position that permits exhaust to flow to the aftertreatment unit through the first exhaust pathway and inhibits exhaust flow thereto through the second exhaust pathway. When the flexible member is a second predetermined temperature, the flexible member is in a second position that permits exhaust flow to the exhaust aftertreatment unit through the second exhaust pathway and inhibits exhaust flow thereto through the first exhaust pathway.

The present disclosure further provides an exhaust system that includes an exhaust aftertreatment unit, a first exhaust pathway in fluid communication with the exhaust aftertreatment unit and upstream of the exhaust aftertreatment unit, a second exhaust pathway in fluid communication with the exhaust aftertreatment unit and upstream of the exhaust aftertreatment unit, an electric heater, and a flow control device operable in a first mode and a second mode. When in the first mode, the flow control device permits exhaust to flow to the aftertreatment unit through the first exhaust pathway and inhibits exhaust flow thereto through the second exhaust pathway, and when in the second mode, the flow control device permits exhaust flow to the exhaust aftertreatment unit through the second exhaust pathway and inhibits exhaust flow thereto through the first exhaust pathway. The flow control device is configured to switch between the first and second modes based on an activation status of the heater. A thermal storage device is disposed within the second exhaust pathway and is configured to store thermal mass and provide thermal insulation to enable a catalyst of the exhaust aftertreatment unit to maintain a minimum predetermined temperature for a minimum predetermined time.

In one form, the flow control device includes a thermally responsive material that is configured to switch the flow control device from the first mode to the second mode when heated by the heater to a predetermined temperature.

In another form, the flow control device is configured to switch between the first and second modes based on a temperature of exhaust gases.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is schematic diagram of a diesel engine and exhaust aftertreatment system in which the principles of the present disclosure are applied;

FIG. 2 a schematic diagram of one form of a thermal storage device according to the teachings of the present disclosure;

FIG. 3 is a schematic diagram of another form of a thermal storage device according to the teachings of the present disclosure;

Figure 1:
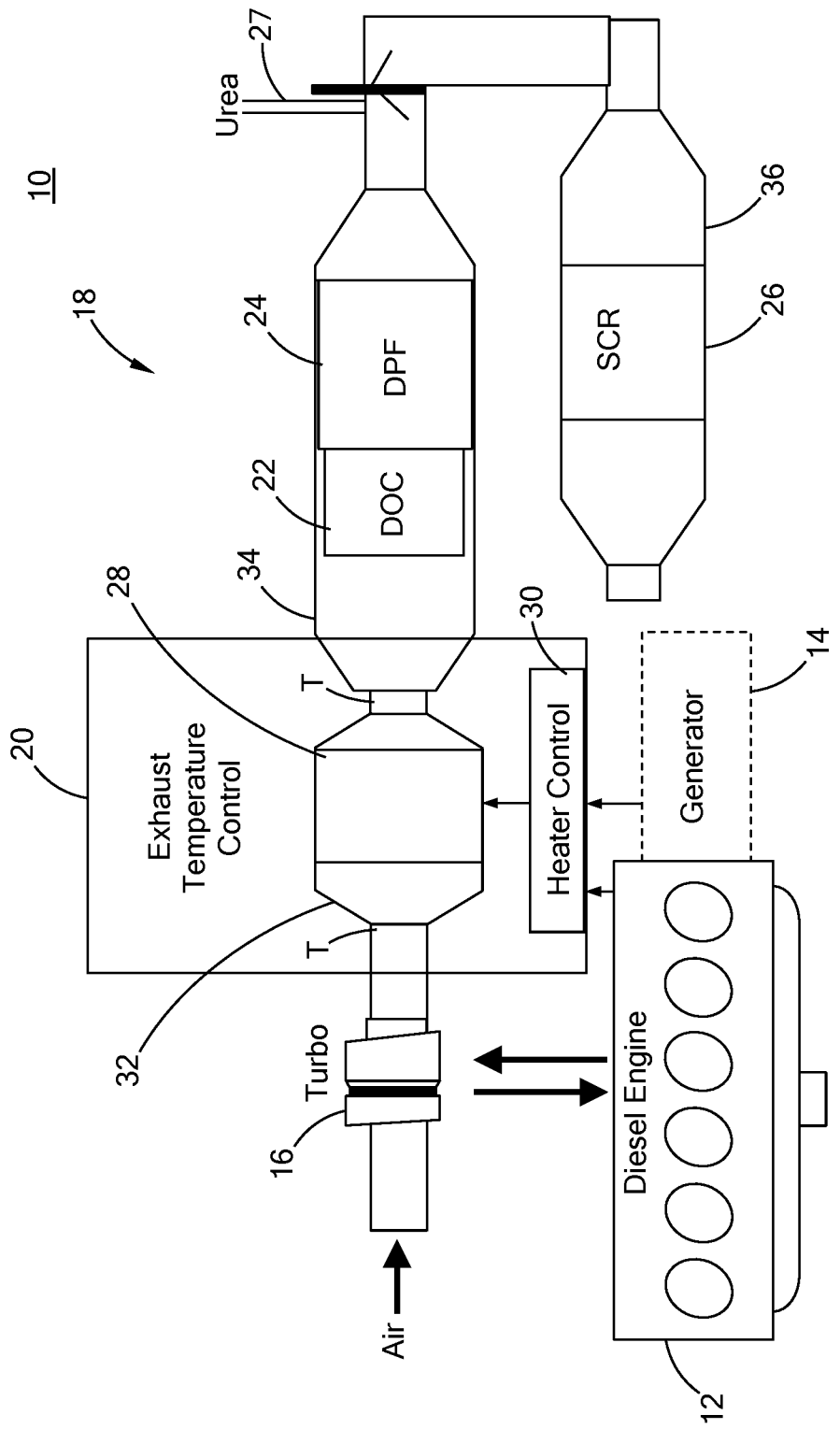

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from the turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, the exhaust aftertreatment system 18 includes a heating system 20, a diesel oxidation catalyst (DOC) 22, a diesel particulate filter device (DPF) 24, and a selective catalytic reduction device (SCR) 26. The heating system 20 includes a heater assembly 28 disposed upstream from the DOC 22, and a heater control device 30 for controlling operation of the heater assembly 28. The exhaust aftertreatment system 18 further includes an upstream exhaust conduit 32 that receives the heater assembly 28 therein, an intermediate exhaust conduit 34 in which the DOC 22 and DPF 24 are received, and a downstream exhaust conduit 36 in which the SCR is disposed. Although a diesel engine 12 is shown, it should be understood that the teachings of the present disclosure are also applicable to a gasoline engine and other fluid flow applications. Therefore, the diesel engine application should not be construed as limiting the scope of the present disclosure.

The DOC 22 is disposed downstream from the heater assembly 28 and serves as a catalyst to oxide carbon monoxide and any unburnt hydrocarbons in the exhaust gas. In addition, The DOC 22 converts nitric oxide (NO) into nitrogen dioxide ($NO_2$). The DPF 24 is disposed downstream from the DOC 22 to remove diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 18, NOx is reduced into $N_2$, $H_2O$ and $CO_2$.

It should be understood that the engine system 10 illustrated and described herein is merely exemplary, and thus other components such as a $NO_x$ absorber or ammonia oxidation catalyst, among others, may be included, while other components such as the DOC 22, DPF 24, and SCR 26 may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

Referring to FIG. 2, an exhaust aftertreatment system according to the teachings of the present disclosure is illustrated and generally indicated by reference numeral 50. The exhaust aftertreatment system 50 generally includes an exhaust treatment unit 52, such as by way of example a selective catalyst reduction unit (SCR). The exhaust treatment unit 52 may be another type of unit, such as a catalytic converter, a diesel particulate filter, a diesel oxidation catalyst, a lean nitrogen oxides (NOx) trap, an ammonia slip catalyst, reformers, a decomposition tube, among others, and combinations thereof.

As shown, the exhaust aftertreatment system 50 further comprises a thermal storage device 54 disposed upstream from the exhaust treatment unit 52. This thermal storage device 54 is generally any device that can store heat or thermal mass, thereby providing "inertia" against temperature fluctuations. The thermal storage device 54 can store heat upstream of the exhaust aftertreatment unit 52 at a predetermined temperature for a predetermined time. More specifically, the thermal storage device is operable to store thermal mass and provide thermal insulation to enable a catalyst to maintain a minimum predetermined temperature for a minimum predetermined time. In one form, the minimum predetermined temperature is approximately 100° C. and the minimum predetermined time is about 8 hours. In another form, the minimum predetermined temperature is approximately 180° C. and the minimum predetermined time is a time span for an FTP-75 (Federal Test Procedure 75) test procedure. Accordingly, the time span and temperatures are across a cold start transient phase, a stabilized phase, a hot soak phase between, and then a hot start transient phase.

As further shown, in another form, at least one heater 56 is disposed proximate the thermal storage device 54. In one example, the thermal storage device 54 is a DPF (diesel particulate filter). In this exemplary form, during a preceding regeneration cycle, the thermal storage device 54 or thermal mass can store large thermal energy when the surroundings are higher in temperature than the mass. When the regeneration cycle is off, the thermal storage device 54 or thermal mass releases the thermal energy gradually when the surrounding temperature is lower than the thermal storage device 54 or thermal mass. Therefore, the thermal storage device 54 can help retain the heat and thus prolongs the regeneration cycle even after the heater 56 is turned off. The thermal storage device 54 is also operable to release thermal energy when the heater 56 is turned off and when the fluid temperature surrounding the thermal storage device 54 is lower than the temperature of the thermal storage device.

The thermal storage device 54 is made of a material that has excellent thermal mass (or thermal capacitance, or heat capacity), which refers to the ability of a body to store thermal energy. If the exhaust aftertreatment unit 52 is a DOC, the thermal storage device 54 can assist with light-off or NO to $NO_2$ conversion. If the exhaust aftertreatment unit 52 is an SCR, the thermal storage device 54 could assist with $NO_x$ conversion. If the exhaust aftertreatment unit 52 is a decomposition tube upstream of an SCR, then the thermal storage device 54 could assist with processing of urea and with $NO_x$ conversion in the decomposition tube.

The thermal storage device 54 may be in the form of a thermal flywheel as shown in FIG. 2. The thermal storage device 54 or thermal flywheel may also include a phase change material, an in one form a phase change material that changes phase at a temperature between 180° C. and 45° C.

Optionally, the thermal storage device 54 may be combined with a thermal insulator (not shown). The combination of heat storage capacity and thermal insulation enables at least one catalyst in the system to remain at a predetermined temperature for a predetermined time resulting in the warm-up period to be reduced or eliminated.

Referring now to FIG. 3, in another form, the exhaust system includes a first fluid flow channel 57 (i.e., a first exhaust pathway) and a second fluid flow channel 58 (i.e., a second exhaust pathway). The first and second fluid flow channels 57, 58 are in fluid communication with the exhaust treatment unit 52 and upstream of the exhaust treatment unit 52. The thermal storage device 54 is positioned in the second fluid flow channel 58 that receives and warms the exhaust gas at times the exhaust gas temperature is low and would otherwise reduce the effectiveness of a catalyst in the exhaust gas flow. This exhaust system 60 further includes a fluid flow control device 62 that causes fluid to flow through the second fluid flow channel 58 when actuated by the heater 56 or 56'. Accordingly, when the heater 56 or 56' is turned on, the fluid flow control device 62 is actuated and causes the fluid to flow through the second fluid flow channel 58. Such heater-actuated flow device may be one of the various forms discussed below with reference to FIGS. 4-11. Alternatively, the second fluid flow channel 58 may cool the exhaust gas at times when the exhaust gas temperature is high (or above a predetermined temperature) and would otherwise reduce the effectiveness of a catalyst in the exhaust gas flow.

In yet another form, the thermal storage device 54 may be disposed within the first fluid flow channel 57 or within both the first fluid flow channel 57 and second fluid flow channel 58.

Figure 4:
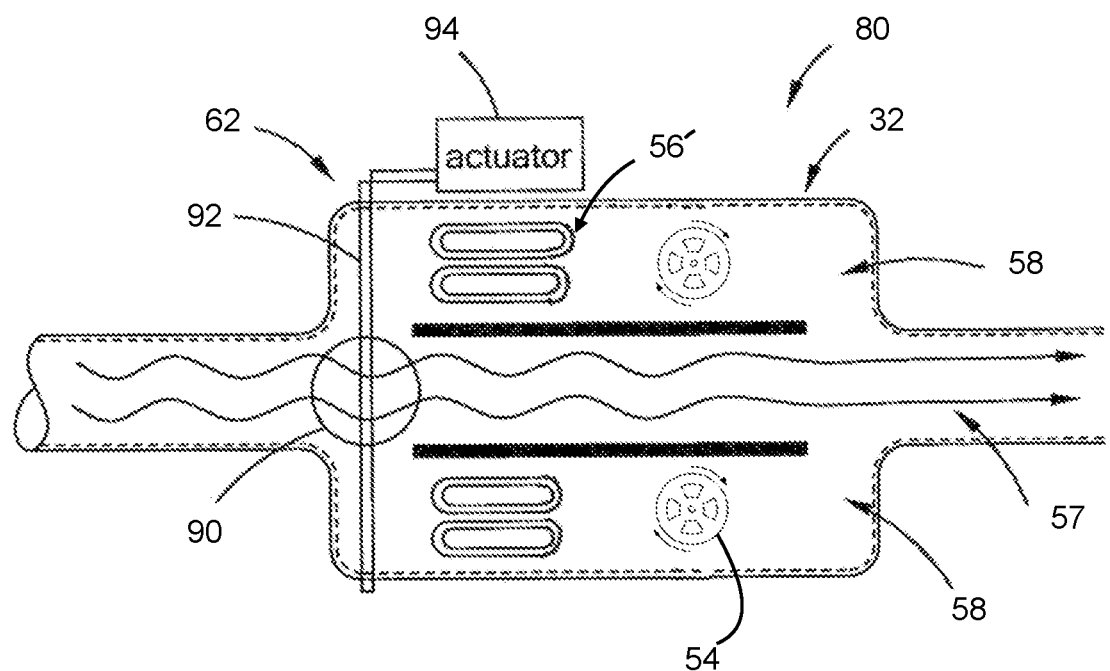
FIG. 4 is a schematic view of a flow control device provided in an upstream exhaust conduit according to the teachings of the present disclosure.

Referring to FIG. 4, one form of the present disclosure has a fluid control system 80 disposed in the upstream exhaust conduit 32 (FIG. 1). The upstream exhaust conduit 32 in one form defines the first flow channel 57 and the second flow channel 58. In the example provided, the second flow channel 58 surrounds the first flow channel 57, though other configurations can be used. For example, the flow channels 57, 58 can be separate as schematically shown in FIG. 3. In the example provided, the first flow channel 57 can be an inner flow channel and the second flow channel 58 an outer flow channel surrounding the first/inner flow channel 57. In the example of FIG. 4, the inlet of the second flow channel 58 is in fluid communication with the inlet of the first flow channel 57 and the outlet of the second flow channel 58 is in fluid communication with the outlet of the first flow channel 57. The first and second flow channels 57, 58 are in a fluid flow path of the exhaust system, such as the exhaust system of FIGS. 1 and 3, and upstream of the exhaust treatment unit 52. In the example provided, the heater 56' is disposed in the second flow channel 58. In an alternative configuration, the heater 56' can be disposed in the first flow channel 57 or upstream of both flow channels 57, 58, such as with heater 56 (FIG. 3). The fluid control system 80 includes the flow control device 62, which can be provided upstream, or generally at the inlets, of the first and second flow channel 57, 58 to control the flow path of the exhaust gas to either of the flow channels 57, 58. The fluid control system 80 further includes an actuator 94 coupled to the flow control device 62 and adapted to actuate the fluid control device 62 when the heater 56 or 56' is turned on. The flow control device 62 may direct the exhaust gas through both the first and second flow channels 57, 58 during normal engine operation when the heater 56 or 56' is not activated. In configuration, the flow control device 62 is actuated when the heater 56 or 56' is turned on. Actuating the flow control device 62 causes the first flow channel 57 to change a fluid flow rate in at least one of the first flow channel 57 and the second flow channel 58. In one configuration, actuating the flow control device 62 causes the flow control device 62 to switch between a first mode in which fluid flows through the first flow channel 57 but not the second flow channel 58, and a second mode in which fluid flows through the second flow channel 58 and is inhibited from flowing through the first flow channel 58. In another form, actuating the flow control device 62 causes the flow control device 62 to switch between a first mode in which fluid flows through both flow channels 57, 58, and a second mode in which fluid is inhibited from flowing through the first flow channel 57 and is continued to be permitted to flow through the second flow channel 58. In another form, actuating the control device 62 causes the flow control device 62 to partially re-directs a portion of the fluid flow through the second flow channel 58.

In another form of the present disclosure, the exhaust gas can be directed through only one of the first flow channel 57 and the second flow channel 58 during normal engine operation. In this configuration, the second flow channel 57 functions as a bypass channel. When the heater 56 or 56' is not actuated, the exhaust gas is directed through only the first flow channel 57. When the heater 56 or 56' is actuated, the exhaust gas is directed through only the second flow channel 58.

Figure 5:
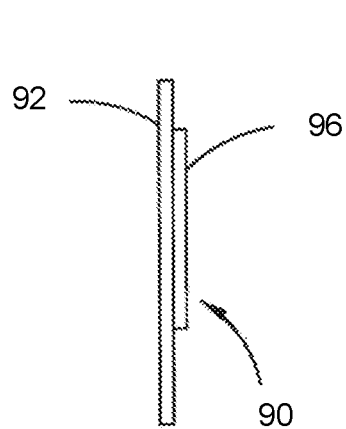
FIG. 5 is a side view of the flow control device of FIG. 4.
Figure 6:
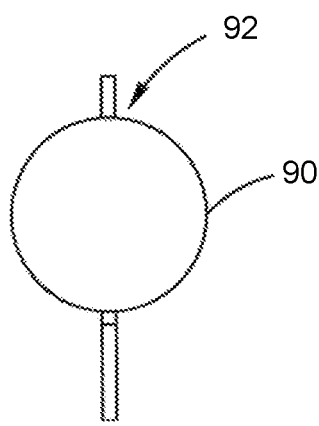
FIG. 6 is a front view of the flow control device of FIG. 4.

Referring to FIGS. 4 through 6, in one form of the present disclosure, the flow control device 62 includes a flapper member 90, a support member 92, and an actuator 94. The support member 92 can be in the form of a bar extending from opposing ends of the flapper member 90 and the actuator 94. In the example provided, the flapper member 90 is disposed upstream from the first and second flow channels 57, 58, such as at the inlet of the first flow channel 57. In one form, flapper member 90 defines a plate body having a position normal to the flow of exhaust gas. When the heater 56 or 56' is not activated, the flapper member 90 is positioned such that the normal direction is perpendicular to the longitudinal axis of the first flow channels 57 and the exhaust gas is allowed to pass through the first flow channel 57. When the heater 56 or 56' is activated, the flapper member 90 is positioned such that its normal direction is parallel to the longitudinal axis of the first flow channel 57 to close the first flow channel 57.

The flow control device 62 can be actuated to position the flapper member 90 in a different position based on the status of the heater 56 or 56'. When regeneration is necessary, the heater 56 or 56' is turned on to heat the exhaust gas flowing through the heater 56 or 56'. The heat from the heater 56 or 56' causes the flow control device 62 to be actuated to direct the flow of the exhaust gas through the second flow channel 58, thereby controlling the flow rate of the exhaust gas thereto.

Optionally, the flow control device 62 may include one or more actuating surfaces 96 that can cause actuation of the flow control device 62 by thermal energy. The thermal energy can be provided through a number of sources, including by way of example, heat from the heater 56 or 56', a reaction to a change in temperature of the heater, the temperature of the exhaust gas, a reaction to a change in temperature of the exhaust gas, differential thermal expansion, and combinations thereof. When regeneration is necessary and the heater 56 or 56' is turned on, the actuating surface 96 faces the heater 56 or 56' and thus is heated. The heated actuating surface 96 may transmit a signal to the actuator 94, causing the actuator 94 to position the flow control device 62 to change the flow path and/or flow rate of the exhaust gas as previously described.

The flow control device 62 may include a flapper valve, butterfly valve, or a similar structure. The actuator 94 may include a material such as a shape memory alloy that changes shape in response to heat or temperature change. In one form of the present disclosure, the flapper member 90 can be made of the shape memory alloys that change shape in response to a temperature or temperature change associated with heater operation. The flow control device 62 can change its mode or position due to the changed shape of the flapper member 90. In another form, the flapper member 90 can be made of bi-metallic construction where a temperature associated with heater operation causes a displacement for actuating flow control device 90. The actuation of the flow control device 90 may be directly actuated by the actuating surface 96 or through the external actuator 94. In the example provided, the thermal storage device 54 is disposed within the second flow channel 58 and can be constructed and function as described above with reference to FIG. 3, to release heat to the exhaust flow or absorb excess heat therefrom.

Figure 7:
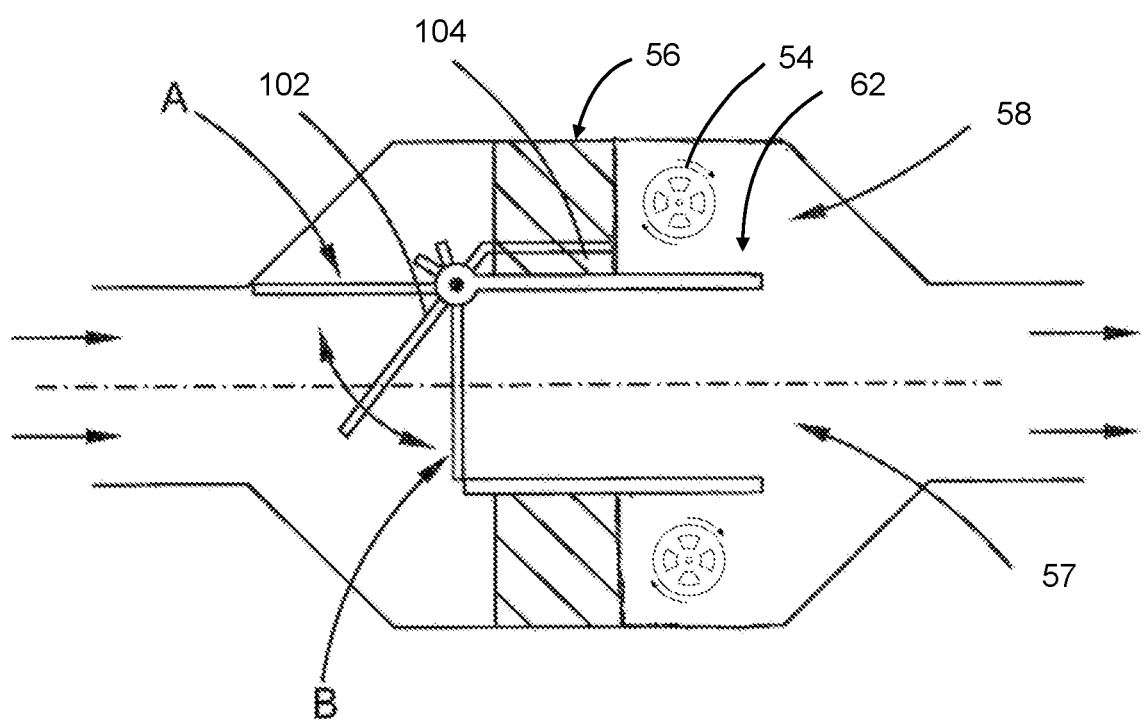
FIG. 7 is a schematic view of another form of a flow control device provided in an upstream exhaust conduit according to the teachings of the present disclosure.

Referring to FIG. 7, another form of a flow control device 62 is provided according to the present disclosure. The flow control device 62 includes a pivoting member 102 and an actuating member 104. As shown, the actuating member 104 is disposed proximate a wall of the first flow channel 57 and in contact with the heater 56', though the actuating member can alternatively be in contact with the heater 56 (FIG. 3). The pivoting member 102 is pivotably connected to the actuating member 104 and is pivotable to move between an open position A (where the first flow channel 57 is open) and a closed position B (where the first flow channel 57 is closed). The pivoting member 102 can further be operable to pivot and reduce fluid flow through first flow channel 57 by being positioned somewhere between a fully open and a fully closed position. In one form, when the heater 56 or 56' is not actuated, the pivoting member 102 is in the open position to allow the exhaust gas to flow through the first flow channel 57. When regeneration is necessary and the heater 56 or 56' is turned on, heat is applied to the actuating member 104 and causes the actuating member 104 to change its shape. The changed shape triggers the pivoting member 102 to move from the open position A to the closed position B or somewhere in between. In a fully closed position B, the first flow channel 57 is closed thereby preventing fluid flow through the first flow channel 57 and opening the second flow channel 58 in which the heater 56' is disposed. As a result, the exhaust gas is directed through the second flow channel 58 and can be heated by the heater 56' and can receive additional heat from the thermal storage device 54. In an alternative configuration, when the temperature of the exhaust gas is higher than desired, it can cause the actuating member 104 to change shape and move the pivoting member 102 while the heater 56' is off so that the thermal storage device 54 can absorb excess heat from the exhaust flow.

Figure 8:
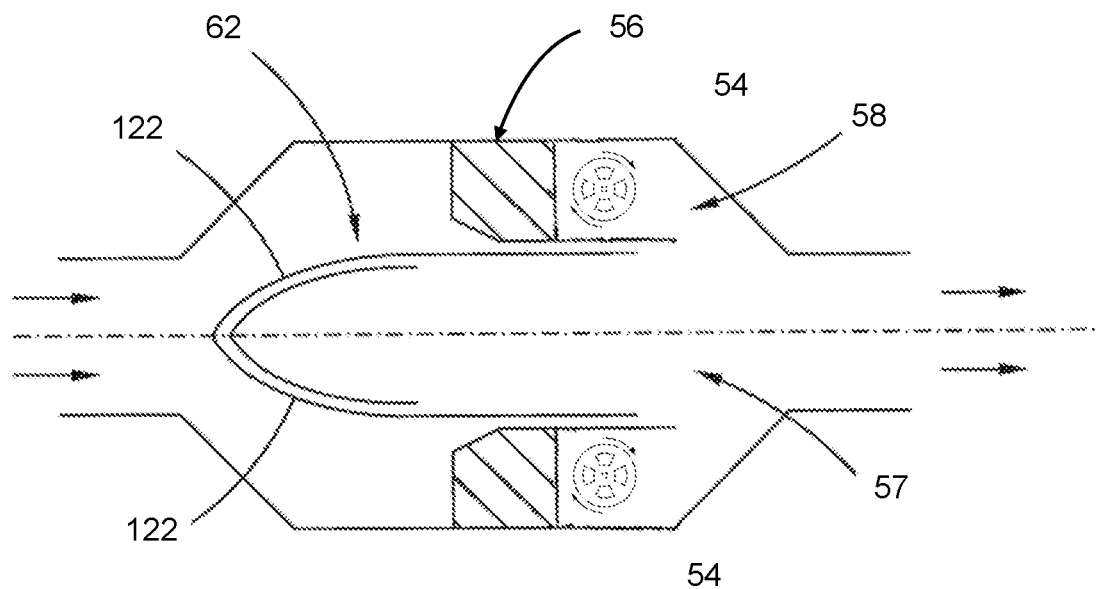
FIG. 8 is a schematic view of yet another form of a flow control device in a closed position provided in an upstream exhaust conduit according to the teachings of the present disclosure.
Figure 9:
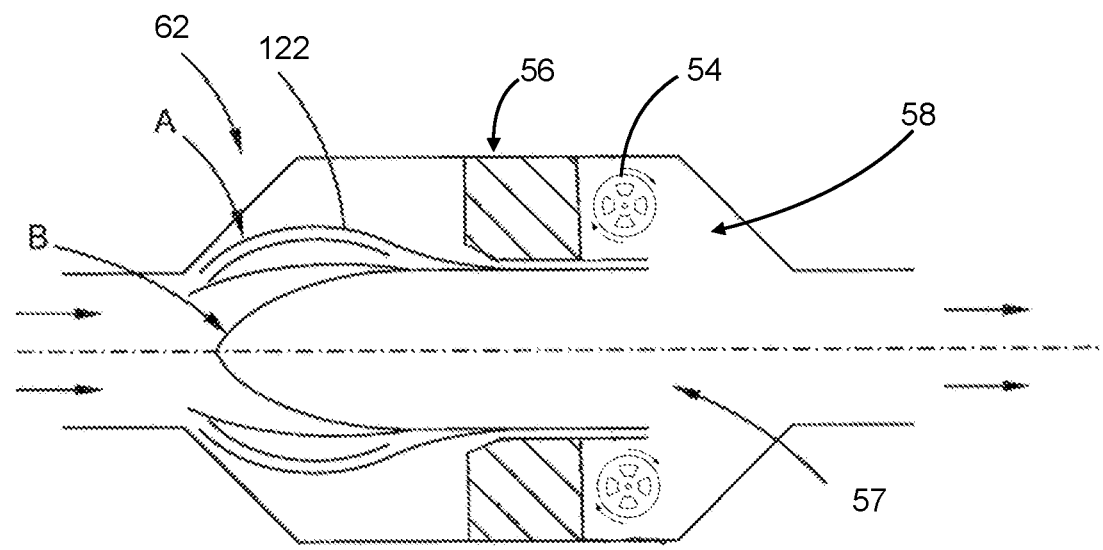
FIG. 9 is a schematic view of the flow control device of FIG. 8 in an open position.

Referring to FIGS. 8 and 9, a flow control device 62 according to another form of the present disclosure includes multiple flexing members 122 that may be of a bi-metallic construction and mounted proximate a wall that defines the first flow channel 57 and positioned near the heater 56 or 56'. The flexing members 122 are movable between an open position A (where the first flow channel 58 is open) and a closed position B (where the first flow channel 58 is closed). This includes various positions between position A and position B. When the heater 56 or 56' is not turned on, the flexing members 122 can be in the open position A to open the first flow channel 57 and to block or reduce fluid flow through the second flow channel 58. When regeneration is necessary and the heater 56 or 56' is actuated, the flexing members 122 change their shape and move toward each other to the closed position B to close or reduce fluid flow through the first flow channel 57. The exhaust fluid is then directed through the second flow channel 58 and can be heated by the heater 56' therein and/or absorb additional heat from the thermal storage unit 54. In an alternative configuration, when the temperature of the exhaust gas is higher than desired, it can cause the flexing member 122 to change shape and move to the position A while the heater 56 or 56' is off so that the thermal storage device 54 can absorb excess heat from the exhaust flow.

The flow control device 62 can be directly actuated by the operation of the heater 56 or 56' without using a separate actuator, such as a motor, solenoid, air cylinder or hydraulic cylinder, and associated control logic. Therefore, an opening through the exhaust pipe may not be needed in order to connect the flow control device 62 to an external actuator and thus leakage of exhaust gas through such an opening would not occur. The flow control device 62 of this form can reduce manufacturing costs and structural complexity.

Figure 10:
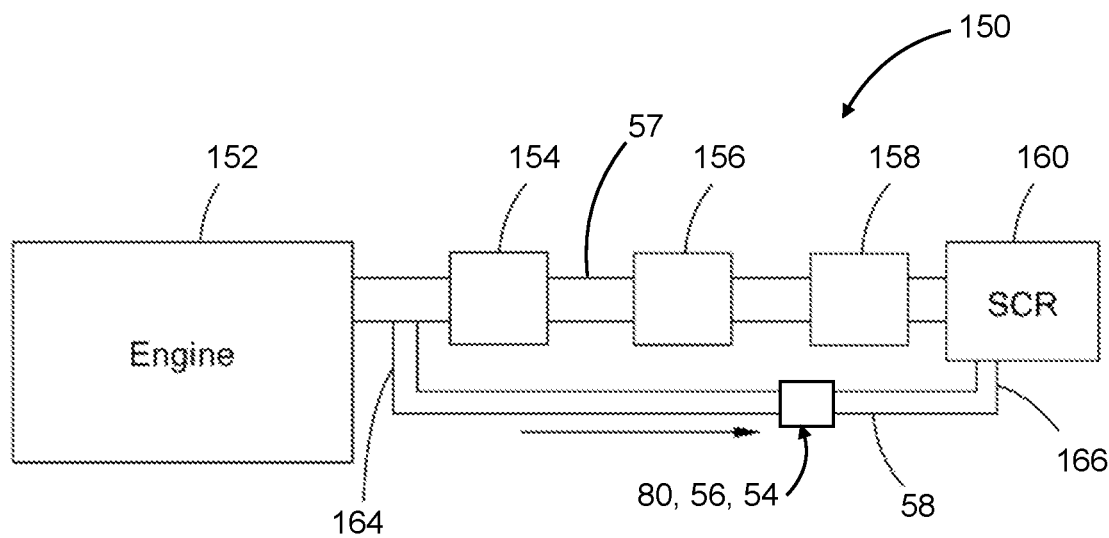
FIG. 10 is a schematic view of an exhaust system according to another form of the present disclosure.

Referring to FIG. 10, an engine system 150 is provided in accordance with another form of the present disclosure and includes a diesel engine 152, an exhaust aftertreatment system, including various exhaust treatment units 154, 156, 158, and an SCR 160. The various exhaust treatment units 154, 156, 158 may be any combination of a catalytic converter, a DPF, a DOC, an LNT, an ammonia slip catalyst, or reformers, depending on the application, and are disposed within the first flow channel 57. The SCR 160 is downstream of the first flow channel 57 and in fluid communication with the outlet thereof. The engine system 150 further includes a bypass conduit 58 coupled to the exhaust fluid flow having an inlet 164 disposed upstream of the various exhaust treatment units 154, 156, 158 and an outlet 166 disposed at a downstream of the various exhaust treatment units 154, 156, 158, which is also an inlet of the SCR 160.

Figure 11:
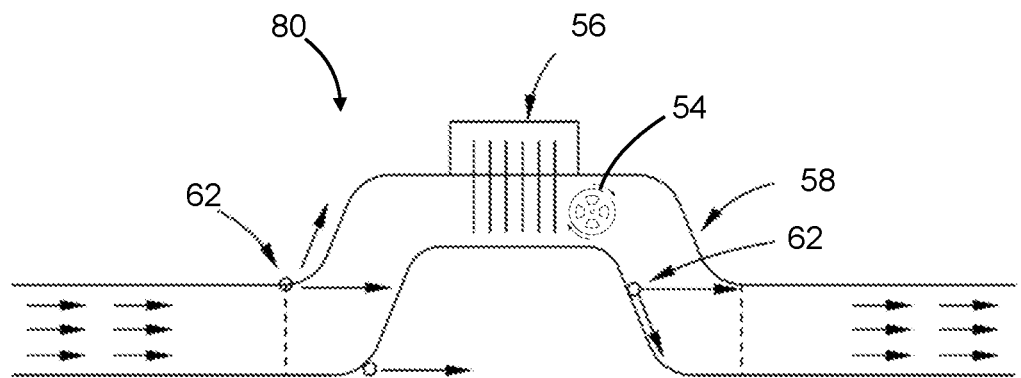
FIG. 11 is a schematic view of a bypass channel where flow control devices are installed at an inlet and an outlet of the bypass channel according to the teachings of the present disclosure.

Referring to FIG. 11, the heater 56' is provided in the bypass conduit 58. Flow control devices 62 as shown in any of the configurations of FIGS. 4 to 9 are disposed at the inlet 164 and outlet 166 of the bypass conduit 58. In one form, during normal engine operation, the bypass conduit 58 is closed. When regeneration is necessary, the flow control devices 62 may open the inlet 164 of the bypass conduit 58 so that the exhaust gas is redirected through the bypass conduit 58 to be heated by the heater 56'. Furthermore, when regeneration is necessary, the flow control device 62 positioned near the outlet 166 of the bypass conduit 58 may close the outlet 166 of the bypass conduit 58 to allow for the exhaust gas to be heated by the heater 56'. By providing a bypass conduit 58 separate from the main exhaust path (e.g., the first flow channel 57) and by providing the heater 56' in the bypass conduit 58, the exhaust gas can more smoothly flow in the bypass conduit 58. Therefore, backpressure caused by the presence of the heater 56' in the main flow path as shown in FIGS. 4 to 9 can be reduced.

The teachings of the present disclosure may also be used within a single conduit or fluid flow channel without being limited to a bypass channel. A heater actuated mechanism may be employed that would change the position, orientation, angle of attack or other geometric characteristic of the heater to allow it to improve heat transfer when the heater is on and to allow it to shift into a position that reduces drag/backpressure when the heater is off. Such a mechanism may be attached directly to the heater or parts of the heater (e.g. a metal member attached directly to the heater surface that would move the heater by differential thermal expansion). Such a mechanism may include any of the fluid control devices and materials as disclosed herein, such as a shape memory alloy.

In other forms, each of the elements illustrated herein can be positioned or reconfigured such that they are aligned with the fluid flow rather than being arranged across the flow. Also, another separate bypass could be employed to divert flow around the heater, similar to a piping system. These variations and configurations should be construed as falling within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An exhaust system comprising:
   an exhaust aftertreatment unit;
   a first exhaust pathway in fluid communication with the exhaust aftertreatment unit and upstream of the exhaust aftertreatment unit;
   a second exhaust pathway in fluid communication with the exhaust aftertreatment unit and upstream of the exhaust aftertreatment unit;
   a thermally activated flow control device operable in a first mode and a second mode, wherein when in the first mode, the flow control device permits exhaust to flow to the aftertreatment unit through the first exhaust pathway and inhibits exhaust flow thereto through the second exhaust pathway, wherein when in the second mode, the flow control device permits exhaust flow to the exhaust aftertreatment unit through the second exhaust pathway and inhibits exhaust flow thereto through the first exhaust pathway, the flow control device being configured to switch between the first and second modes based on a change of temperature;
   an electric heater; and
   a thermal storage device disposed within the second exhaust pathway and positioned to absorb thermal energy from the electric heater, wherein the thermal storage device is configured to store thermal mass and provide thermal insulation to enable a catalyst material of the exhaust aftertreatment unit to maintain a minimum predetermined temperature for a minimum predetermined time.

2. The exhaust system according to claim 1, wherein the electric heater is disposed upstream of the thermal storage device.

3. The exhaust system according to claim 2, wherein the electric heater is disposed within the second exhaust pathway.

4. The exhaust system according to claim 2, wherein the flow control device is configured to switch to the second mode when the electric heater is turned on.

5. The exhaust system according to claim 4, wherein the electric heater is disposed in the second exhaust pathway.

6. The exhaust system according to claim 4, wherein the thermal storage device is configured to release thermal energy when the electric heater is turned off and when a fluid temperature surrounding the thermal storage device is lower than a temperature of the thermal storage device.

7. The exhaust system according to claim 1, wherein the exhaust aftertreatment unit is selected from the group consisting of a catalytic converter, a diesel particulate filter, a selective catalytic reduction, a diesel oxidation catalyst, a lean nitrogen oxides (NOx) trap, an ammonia slip catalyst, reformers, a decomposition tube, and combinations thereof.

8. The exhaust system according to claim 1, wherein the flow control device is configured to switch to the second mode when an exhaust fluid temperature is above a predetermined temperature, wherein the thermal storage device is configured to absorb heat from the exhaust fluid to cool the exhaust fluid when the exhaust fluid is above the predetermined temperature.

9. The exhaust system according to claim 1, wherein the thermal storage device comprises a phase change material.

10. The exhaust system according to claim 9, wherein the thermal storage device changes phase between a temperature of approximately 180° C. and 450° C.

11. The exhaust system according to claim 1, wherein the first exhaust pathway is an inner flow channel and the second exhaust pathway is an outer flow channel surrounding the inner flow channel.

12. The exhaust system according to claim 1, wherein the second exhaust pathway is a bypass channel disposed outside of a fluid flow path of the first exhaust pathway.

13. The exhaust system according to claim 1, further comprising an actuator coupled to the flow control device and configured to switch the flow control device between the first and second modes.

14. The exhaust system according to claim 13, wherein the actuator is powered by thermal energy.

15. The exhaust system according to claim 13, wherein the actuator includes a material selected from the group consisting of a shape memory alloy, a bimetallic construction, and combinations thereof.

16. The exhaust system according to claim 1, wherein the flow control device includes a flapper member disposed upstream of the first and second exhaust pathways, the flapper member configured to change position in response to heat from the electric heater.

17. The exhaust system according to claim 1, wherein the flow control device includes at least one flexible member configured to change shape based on temperature, wherein when the at least one flexible member is a first predetermined temperature, the at least one flexible member is in a first position that permits exhaust to flow to the aftertreatment unit through the first exhaust pathway and inhibits exhaust flow thereto through the second exhaust pathway, wherein when the at least one flexible member is a second predetermined temperature, the at least one flexible member is in a second position that permits exhaust flow to the exhaust aftertreatment unit through the second exhaust pathway and inhibits exhaust flow thereto through the first exhaust pathway.

18. An exhaust system comprising:
    an exhaust aftertreatment unit;
    a first exhaust pathway in fluid communication with the exhaust aftertreatment unit and upstream of the exhaust aftertreatment unit;
    a second exhaust pathway in fluid communication with the exhaust aftertreatment unit and upstream of the exhaust aftertreatment unit;
    an electric heater;
    a flow control device operable in a first mode and a second mode, wherein when in the first mode, the flow control device permits exhaust to flow to the aftertreatment unit through the first exhaust pathway and inhibits exhaust flow thereto through the second exhaust pathway, wherein when in the second mode, the flow control device permits exhaust flow to the exhaust aftertreatment unit through the second exhaust pathway and inhibits exhaust flow thereto through the first exhaust pathway, the flow control device being configured to switch between the first and second modes based on an activation status of the electric heater; and
    a thermal storage device disposed within the second exhaust pathway, wherein the thermal storage device is configured to store thermal mass and provide thermal insulation to enable a catalyst of the exhaust aftertreatment unit to maintain a minimum predetermined temperature for a minimum predetermined time.

19. The exhaust system according to claim 18, wherein the flow control device includes a thermally responsive material that is configured to switch the flow control device from the first mode to the second mode when heated by the electric heater to a predetermined temperature.

20. The exhaust system according to claim 18, wherein the flow control device is configured to switch between the first and second modes based on a temperature of exhaust gases.

* * * * *